United States Patent
Klein et al.

(10) Patent No.: US 10,557,449 B2
(45) Date of Patent: Feb. 11, 2020

(54) METHOD FOR ASCERTAINING A TORQUE ACCURACY OF A TORQUE TRANSMITTED FROM A BELT-DRIVEN STARTER-GENERATOR OF AN INTERNAL COMBUSTION ENGINE TO THE INTERNAL COMBUSTION ENGINE

(71) Applicant: SEG Automotive Germany GmbH, Stuttgart (DE)

(72) Inventors: Benjamin Klein, Bietigheim-Bissingen (DE); Tobias Trzebiatowski, Stuttgart (DE); Andreas Greis, Stuttgart (DE); Bernd Schroeder, Renningen (DE); Istvan Deak, Ludwigsburg (DE); Mario Kaepple, Oehringen (DE); Martin Henger, Tamm (DE)

(73) Assignee: SEG Automotive Germany GMBH, Stuttgart (DE)

( * ) Notice: Subject to any disclaimer, the term of this patent is extended or adjusted under 35 U.S.C. 154(b) by 27 days.

(21) Appl. No.: 15/746,152

(22) PCT Filed: Jun. 15, 2016

(86) PCT No.: PCT/EP2016/063686
§ 371 (c)(1),
(2) Date: Jan. 19, 2018

(87) PCT Pub. No.: WO2017/012784
PCT Pub. Date: Jan. 26, 2017

(65) Prior Publication Data
US 2018/0283342 A1    Oct. 4, 2018

(30) Foreign Application Priority Data
Jul. 22, 2015    (DE) ......................... 10 2015 213 763

(51) Int. Cl.
*F02N 11/10*    (2006.01)
*F02N 11/04*    (2006.01)
(Continued)

(52) U.S. Cl.
CPC ............ *F02N 11/108* (2013.01); *F02B 67/06* (2013.01); *F02D 41/042* (2013.01); *F02D 41/22* (2013.01);
(Continued)

(58) Field of Classification Search
CPC .... F02N 11/108; F02N 15/08; F02N 11/0814; F02N 11/04; F02N 2200/14;
(Continued)

(56) References Cited

U.S. PATENT DOCUMENTS 9,108,638 B2 *    8/2015  Banker ................. B60W 20/00
9,267,448 B2 *    2/2016  Kuroki ................ F02D 41/0087
(Continued)

FOREIGN PATENT DOCUMENTS

DE         19704153 A1    8/1998
DE     102009055062 A1    6/2011
(Continued)

OTHER PUBLICATIONS

International Search Report dated Sep. 22, 2015, of the corresponding International Application PCT/EP20106/063686 filed Jun. 15, 2016.

*Primary Examiner* — Joseph J Dallo
(74) *Attorney, Agent, or Firm* — Norton Rose Fulbirght US LLP

(57) ABSTRACT

A method for ascertaining a torque accuracy of a torque transmitted from a belt-driven starter-generator of an internal combustion engine to the internal combustion engine, which is similar to a learning process or a calibration of the actual torque of the starter-generator with respect to a
(Continued)

setpoint torque, includes controlling the belt-driven starter-generator to transmit a specified test torque to the internal combustion engine during a predefined test time interval during coasting down of the internal combustion engine, determining a speed variable that is dependent on a speed of the internal combustion during the test time interval, comparing the speed variable to a reference variable, and deducing the torque accuracy from this comparison.

9 Claims, 2 Drawing Sheets

(51) Int. Cl.
| | | |
|---|---|---|
| *F02N 11/08* | (2006.01) | |
| *F02N 15/08* | (2006.01) | |
| *F02B 67/06* | (2006.01) | |
| *F02D 41/04* | (2006.01) | |
| *F02D 41/22* | (2006.01) | |

(52) U.S. Cl.
CPC .......... *F02N 11/04* (2013.01); *F02N 11/0814* (2013.01); *F02N 15/08* (2013.01); *F02D 2200/101* (2013.01); *F02D 2250/24* (2013.01); *F02N 2200/022* (2013.01); *F02N 2200/042* (2013.01); *F02N 2200/14* (2013.01); *Y02T 10/48* (2013.01)

(58) Field of Classification Search
CPC ......... F02N 2200/042; F02N 2200/022; F02B 67/06; F02D 41/22; F02D 41/042; F02D 2250/24; F02D 2200/101; Y02T 10/48
See application file for complete search history.

(56) References Cited

U.S. PATENT DOCUMENTS

| | | | |
|---|---|---|---|
| 9,376,106 B2 * | 6/2016 | Ketfi-Cherif | B60W 10/02 |
| 9,533,669 B2 * | 1/2017 | Kono | B60W 10/02 |
| 9,551,415 B2 * | 1/2017 | Fodor | F16H 61/0437 |
| 9,702,315 B1 * | 7/2017 | Palmer | F02D 43/00 |
| 10,215,102 B2 * | 2/2019 | Yanagihara | F02D 9/02 |
| 2005/0050965 A1 * | 3/2005 | Zaremba | B60K 6/48 |
| | | | 73/862.08 |
| 2009/0024287 A1 * | 1/2009 | Laubender | F02N 11/0844 |
| | | | 701/51 |
| 2012/0271493 A1 * | 10/2012 | Gratton | B60L 15/20 |
| | | | 701/22 |
| 2013/0297112 A1 | 11/2013 | Gibson et al. | |
| 2014/0121871 A1 * | 5/2014 | Kim | B60K 6/442 |
| | | | 701/22 |
| 2015/0006006 A1 * | 1/2015 | Scheidle | B60L 15/2045 |
| | | | 701/22 |

FOREIGN PATENT DOCUMENTS

| | | |
|---|---|---|
| FR | 2768666 A1 | 3/1999 |
| GB | 2304902 A | 3/1997 |
| WO | 2004018246 A1 | 3/2004 |

* cited by examiner

METHOD FOR ASCERTAINING A TORQUE ACCURACY OF A TORQUE TRANSMITTED FROM A BELT-DRIVEN STARTER-GENERATOR OF AN INTERNAL COMBUSTION ENGINE TO THE INTERNAL COMBUSTION ENGINE

CROSS-REFERENCE TO RELATED APPLICATIONS

The present application is the national stage of International Pat. App. No. PCT/EP2016/063686 filed Jun. 15, 2016, and claims priority under 35 U.S.C. § 119 to DE 10 2015 213 763.5, filed in the Federal Republic of Germany on Jul. 22, 2015, the content of each of which are incorporated herein by reference in their entireties.

FIELD OF THE INVENTION

The present invention relates to a method for ascertaining a torque accuracy of a torque transmitted from a belt-driven starter-generator of an internal combustion engine to the internal combustion engine and to a processing unit and a computer program for carrying out the method.

BACKGROUND

Electric machines are utilized in motor vehicles as so-called starter-generators for starting the internal combustion engine in the motor mode of the electric machine, on the one hand and, on the other hand, for generating current for the vehicle electrical system and for charging the motor vehicle battery in the generator mode of the electric machine. Such electric machines can be connected to the internal combustion engine or to the crankshaft via a belt, for example via the V-ribbed belt of the internal combustion engine (so-called belt-driven starter-generators).

DE 10 2009 055 062 A1, for example, describes a method for validating a drive torque applied by an electric machine in a hybrid drive of a motor vehicle. In this case, a check is carried out to determine whether the drive torque applied by the electric machine is accurately determined. The method is based on a check carried out to determine whether the torque of the electric motor corresponds to the drag torque of the internal combustion engine.

SUMMARY

The present invention provides a method for ascertaining a torque accuracy of a torque transmitted from a belt-driven starter-generator of an internal combustion engine to the internal combustion engine as well as a processing unit and a computer program for carrying out the method.

In this context, "torque accuracy" is understood to mean how strongly a torque actually transmitted from the belt-driven starter-generator (actual value of the transmitted torque) deviates from a specified torque to be transmitted (setpoint value of the transmitted torque). If the actually transmitted torque deviates from the specified torque by a greater extent than was assumed, the torque accuracy is considered to be insufficient.

In order to ascertain the torque accuracy, a specified test torque is transmitted from the belt-driven starter-generator to the internal combustion engine during a predefined test time interval during coasting down of the internal combustion engine. This test torque is specified, in particular, as a setpoint value by a controller or a control unit of the belt-driven starter-generator and/or the internal combustion engine. For example, the test time interval can be between 100 ms and 1.5 s and the test torque is, in particular, between 0.2 Nm and 2 Nm.

In this context, "coasting down of the internal combustion engine" is understood to mean that the internal combustion engine is deactivated during its on-going operation and no longer actively generates torque. After deactivation of the internal combustion engine, the speed decreases during coasting down until the internal combustion engine comes to a standstill, in particular according to a known theoretical speed curve.

In particular, coasting down of the internal combustion engine takes place when the corresponding motor vehicle is stopped, for example when the motor vehicle is parked. Coasting down can also be carried out as part of a so-called start/stop operation. As part thereof, an automatic stop of the internal combustion engine can be carried out, for example, when the motor vehicle is at a standstill (for example, when at a standstill at a red traffic light) or during coasting of the motor vehicle (when the motor vehicle is moving toward a red traffic light, for example).

When the test torque is transmitted to the internal combustion engine during coasting down, the speed curve changes and the speed decreases more slowly during the test time interval. In particular, it is likewise known how the speed should theoretically decrease during the test time interval in light of the imparted test torque.

When a torque accuracy is sufficient, the specified test torque and the actually transmitted torque essentially match. In this case, the speed decreases as theoretically expected. When the torque accuracy is insufficient, an actual torque which is either greater than or less than the specified test torque is transmitted from the belt-driven starter-generator. In this case, the speed curve deviates from the theoretical expectation.

In this case, the speed of the internal combustion engine is a measure for ascertaining the torque accuracy. Therefore, a speed variable which depends on the speed of the internal combustion engine is determined and evaluated during the test time interval. The determined speed variable is compared to a reference variable. This reference variable characterizes, in particular, the theoretically expected speed curve during the test time interval as a function of the test torque. The torque accuracy is deduced from this comparison between the determined speed variable and the reference variable.

Due to the method for ascertaining the torque accuracy, deviations between the actual torque and the setpoint torque of the belt-driven starter-generator can be detected in a technically simple and cost-effective way. In this case, it is not necessary to actually determine the torque of the internal combustion engine or of the belt-driven starter-generator.

Such deviations may occur, for example, due to material and manufacturing tolerances of components, for example sensors, actuators, etc., or due to aging effects or wear and tear. For example, a structural change in the belt, for example an elongation of the belt (in particular due to aging of the conveyor cord) or wear of the belt (for example, wear of the belt surface, in particular of the ribs, as a result of which the belt for the belt drive becomes longer) may result in such deviations. Deviations may also occur due to present environmental conditions, for example due to the ambient temperature.

These deviations can be detected by the method during the on-going operation of the motor vehicle. It is not necessary to test the belt-driven starter-generator or its components individually for aging effects or wear and tear or material and manufacturing tolerances, for example as part of regular service visits in a repair shop. The ascertainment of the torque accuracy can be carried out, for example, as part of any coasting down of the motor vehicle, for example every time the motor vehicle is at a standstill at a red traffic light, or after predefined triggering occurrences, for example once a week, or during every first coasting down after every 100 driving hours or after every 1000 km. The ascertainment of the torque accuracy can also be activated as a service function, however, in order to break in the behavior of the motor vehicle to new vehicle parts (for example, V-ribbed belts) within the scope of a repair.

Advantageously, when an insufficient torque accuracy is deduced, a compensation or correction of the torque transmitted from the belt-driven starter-generator is carried out. For example, the specified test torque can be changed, as part of the correction, during further test time intervals and the torque variable can be evaluated during these further test time intervals for as long as it takes for the torque accuracy to be sufficiently high during one of these test time intervals. In particular, the test torque is changed for as long as it takes for the speed to decrease according to the theoretical expectation during one of these test time intervals.

In particular, a correction factor can be determined as part of this correction, which indicates the extent by which the actually transmitted torque and the specified torque deviate from each other. For example, this correction factor results as a quotient of the test torque at which a sufficiently high torque accuracy is deduced, divided by the test torque specified at the beginning of the method. This correction factor can then be applied to the torque to be transmitted.

Manufacturing and material tolerances as well as aging effects and wear and tear are therefore implicitly taken into account without carrying out complex and cost-intensive repairs or mechanical interventions. In addition, a consistent quality of the belt-driven starter-generator can be ensured. In particular, it is ensured that, in a boost-recuperation mode, exactly one desired torque is transmitted from the internal combustion engine to the belt-driven starter-generator in order to store energy in a battery, and that too much torque is not unintentionally transmitted, which may result in undesirable performance losses of the internal combustion engine. In a similar way, it can be ensured that a desirable torque is transmitted from the belt-driven starter-generator to the internal combustion engine when the internal combustion engine is supported by the electric machine. In particular, the driving experience is therefore prevented from being adversely affected by unintended torque jumps.

For example, when the internal combustion engine is designed as a diesel engine, the belt-driven starter-generator can be utilized for regenerating an $NO_x$ storage catalyst in an improved way. The operating point of the diesel engine can be shifted toward higher loads in this case. Excess energy can be recuperated with the aid of the belt-driven starter-generator and temporarily stored in the battery. The stored energy can be converted into engine torque again, as necessary, by "boosting." Due to such dynamic torque support, an engine-internal reduction in $NO_x$ emissions can be achieved. Due to the method, it can be ensured that the corresponding desired effect is achieved with the aid of high torque accuracy.

According to an example embodiment, the speed itself or a speed curve is determined as the speed variable. Principle-related, cyclical oscillations of the speed curve of an internal combustion engine can be taken into account with the aid of suitable filters, so that the speed is correctly interpreted within the sense of the method. Other variables can also be determined as a speed variable, however, for example the torque or an oscillation frequency of the internal combustion engine or its curves. The speed is mostly determined any way as part of the regular operation of the internal combustion engine, for which no additional sensors or computing operations are necessary. In addition, a slope of the speed can be determined as the speed variable.

Preferably, a check is carried out as part of the comparison between the determined speed variable and the reference variable to determine whether the speed decreases according to a theoretical reference curve during the test time interval. When this is not the case, an insufficient torque accuracy is preferably deduced. On the basis of the torque variable, a check is preferably carried out to determine whether the speed decreases according to a theoretically expected reference speed curve during the test time interval. If the speed does not decrease according to this reference speed curve during the test time interval, but rather more quickly or more slowly, it is deduced that the torque actually transmitted from the belt-driven starter-generator does not match the specified test torque and that the torque accuracy is insufficient.

According to an example embodiment, a statistical evaluation of a plurality of determined speed variables, which are gathered, in particular, over a certain period of time, is carried out. In particular, given a plurality of coasting-down processes of the internal combustion engine, a value for the speed variable is determined in each case. These different values for the speed variable are each stored, for example, in a memory area of a control unit. For example, a mean value of these individual values of the speed variable can be determined and evaluated. Therefore, brief fluctuations in the torque accuracy, for example due to fluctuating engine temperature, can be averaged out and only a long-term change in the torque accuracy is then taken into account. In this way, aging effects or wear and tear of the belt, in particular, can be deduced, such as, for example, an elongation or wear of the belt. Preferably, a time series analysis of the plurality of determined speed variables is carried out. By way of the time series analysis, a trend or a trend line, in particular of the speed variable, can be determined.

Advantageously, the result of the evaluation of the speed variable or the evaluated speed variable is checked for plausibility with the aid of statistical functions. Implausible measured values which may result, for example, from non-influenceable boundary conditions such as, for example, temperature fluctuations, can therefore be detected and sorted out or ignored.

A processing unit according to the present invention, for example a control unit of a motor vehicle, is configured, in particular via programming, to carry out a method according to the present invention.

The implementation of the method in the form of a computer program is also advantageous, since this incurs particularly low costs, in particular when an executing control unit is also used for further tasks and is therefore present anyway. Suitable data carriers for providing the computer program are, in particular, magnetic, optical, and electrical memories, such as, for example, hard drives, flash memories, EEPROMs, DVDs, and many others. It is also possible to download a program via computer networks (Internet, intranet, etc.).

Further advantages and embodiments of the present invention result from the description and the attached drawings.

The present invention is schematically represented in the drawings on the basis of exemplary embodiments and is described in the following with reference to the drawings.

DETAILED DESCRIPTION

Figure 1:
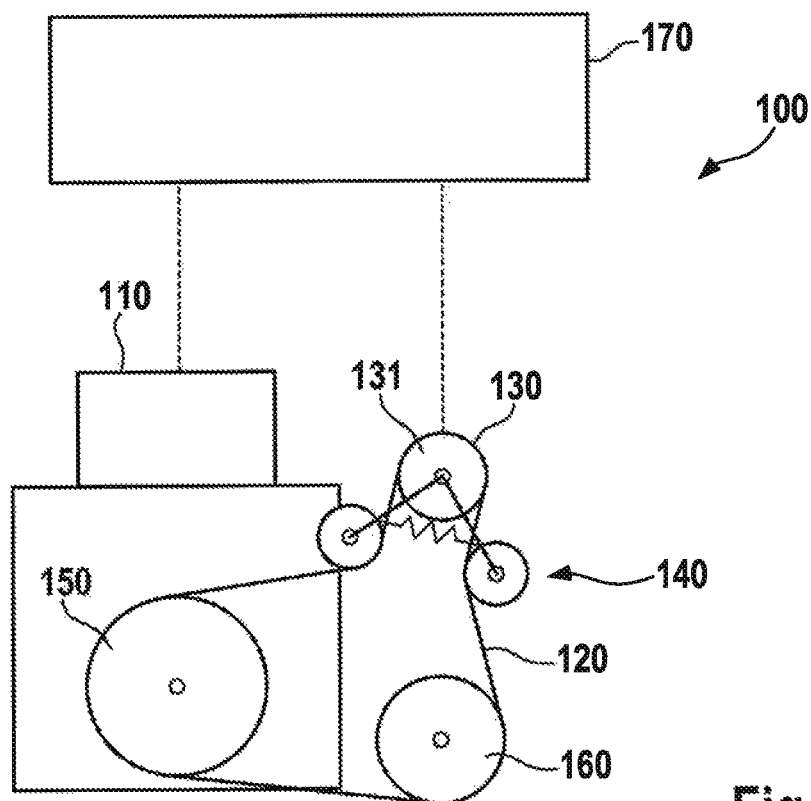
FIG. 1 schematically shows a belt drive of a motor vehicle, the drive including an internal combustion engine and a belt-driven starter-generator, which is configured for carrying out a method according to an example embodiment of the present invention.

A belt drive of a motor vehicle is schematically represented and labeled with 100 in FIG. 1. An internal combustion engine 110 of the motor vehicle includes a crankshaft which is attached to a crankshaft drive wheel 150 in a rotatably fixed manner. Crankshaft drive wheel 150 is designed, for example, as a pulley.

Internal combustion engine 110 is connected to a belt-driven starter-generator 130 in a torque-transmitting manner via a belt 120, for example via a V-ribbed belt. Belt 120 engages into crankshaft drive wheel 150 and into a drive wheel 131 of starter-generator 130 in a force-locked and/or form-fit manner, in particular. Drive wheel 131 is rotatably fixedly connected to a rotor of starter-generator 130. Internal combustion engine 110 can be connected to further components 160, such as ventilators or coolant pumps, via belt 120. In addition, a belt tensioner 140 can be provided, in order to pretension belt 120.

Figure 2:
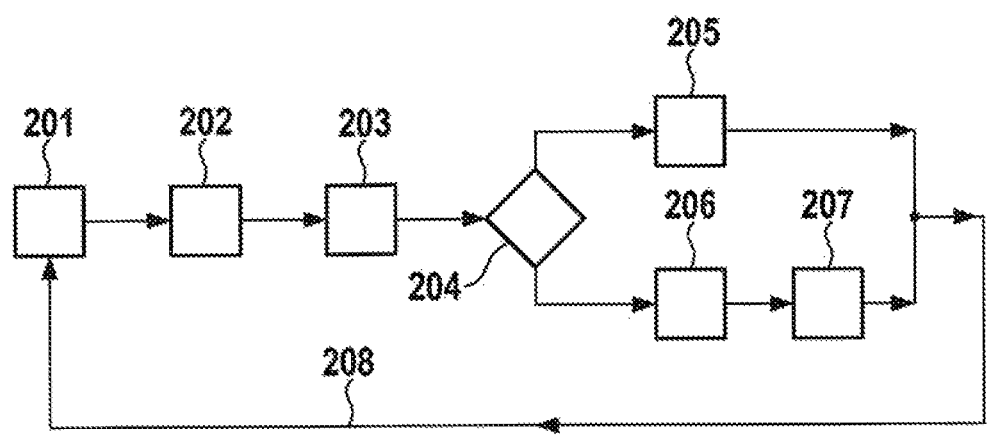
FIG. 2 is a flowchart that illustrates a method according to an example embodiment of the present invention.

A control unit 170 is configured for controlling internal combustion engine 110 and starter-generator 130. Control unit 170 is configured, in particular, for carrying out a method according to an example embodiment of the present invention, which is schematically represented in FIG. 2.

The motor vehicle is regularly operated, for example, in road traffic in this case. In step 201, internal combustion engine 110 is deactivated, for example, as part of a start/stop operation, for example because the motor vehicle comes to a standstill at a red traffic light. Internal combustion engine 110 then coasts down and the speed decreases until internal combustion engine 110 comes to a standstill.

In step 202, a test torque of, for example, 1 Nm is specified by control unit 170. Control unit 170 activates starter-generator 130, so that the starter-generator transmits the specified test torque to the internal combustion engine via belt 120 during a predefined test time interval of, for example, 100 ms.

It is known, in particular, how the speed of internal combustion engine 110 should theoretically decrease after deactivation. It is likewise known how the speed should theoretically decrease as a function of the imparted test torque during the test time interval. Therefore, a reference speed curve theoretically expected during the test time interval is predefined.

When the torque actually transmitted from starter-generator 130 to internal combustion engine 110 corresponds to the specified test torque, the speed should decrease according to the reference speed curve during the test time interval. If the actually transmitted torque (actual torque) and the specified test torque (setpoint torque) deviate from each other, for example due to aging effects or wear and tear or material or manufacturing tolerances, the speed decreases during the test time interval more quickly or more slowly than the reference speed curve.

In step 203, the speed of internal combustion engine 110 is therefore determined as the speed variable during the test time interval. In step 204, the determined speed is evaluated and is compared to the reference speed curve as the reference variable. In this case, a check is carried out, in particular, to determine whether or not the speed decreases according to the reference speed curve in the test time interval. On the basis thereof, a torque accuracy of the torque transmitted from starter-generator 130 to internal combustion engine 110 is deduced.

If the speed decreases according to the reference speed curve during the test time interval, it is deduced in step 205 that the torque accuracy is sufficiently high. If the speed does not decrease according to the reference speed curve during the test time interval, the actually transmitted torque and the specified test torque deviate from each other. In this case, it is deduced in step 206 that the torque accuracy is not sufficiently high. In this case, a correction of the torque transmitted from starter-generator 130 is carried out in step 207. In this case, in step 207, the specified test torque is changed, during further test time intervals of 100 ms in each case during the same coasting-down process and/or, in particular, during other subsequent coasting-down processes, for as long as it takes for the speed to decrease according to the reference speed curve and, therefore, for the torque accuracy to be sufficiently high during one of these time intervals.

In addition, a correction factor can be determined, which indicates how strongly the actually transmitted torque deviates from the specified test torque. For example, a quotient of the test torque at which the speed decreases according to the reference speed curve during the corresponding time interval divided by the test torque specified according to step 202 is determined as the correction factor. This correction factor is taken into account in the future during the activation of starter-generator 130.

The method is aborted, in particular, when the speed increases again, in steps 201 to 204, due to a driver demand (for example, a restart). In all cases, both in the case of an abort as well as the case of sufficient or insufficient torque accuracy, the method for ascertaining the torque accuracy is repeated as soon as internal combustion engine 110 coasts down again, as indicated by reference numeral 208. The speed determined and evaluated in particular step 203 can be stored in a memory area of control unit 170 and utilized for a time series analysis. Implausible measured values resulting due to non-influenceable boundary conditions can therefore be detected with the aid of statistical functions and ignored.

In FIG. 3, diagrams of speed N of internal combustion engine 110, plotted against time t, are schematically represented, which can be determined as part of the method according to an example embodiment of the present invention.

Figure 3A:
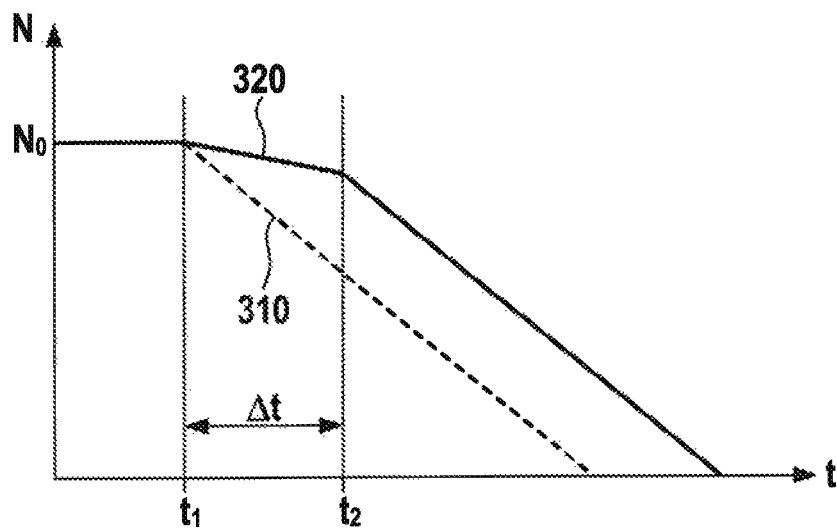
FIG. 3 schematically shows diagrams of a speed of an internal combustion engine, plotted against time, which can be determined as part of a method according to an example embodiment of the present invention.

In the diagrams represented in FIG. 3, internal combustion engine 110 is deactivated at a point in time $t_1$ according to step 201. Before point in time $t_1$, internal combustion engine 110 is operated, for example in idling mode, at an idling speed No of, for example, 700 rpm. After deactivation of internal combustion engine 110, the internal combustion engine coasts down and the speed decreases to zero according to curve 310 shown in FIG. 3a.

If the test torque of 1 Nm is imparted between point in time $t_1$ and point in time $t_2$ during test time interval $\Delta t$ of 100 ms, the speed curve changes and the speed decreases from idling speed No according to curve 320 represented in FIG. 3a during test time interval $\Delta t$.

In this case, curve 320 corresponds to the case in which the actually transmitted torque and the specified test torque match and the torque accuracy is sufficiently high, similar to step 206.

Curve 320 between point in time $t_1$ and point in time $t_2$ during test time interval $\Delta t$ is therefore the reference speed curve.

Figure 3B:
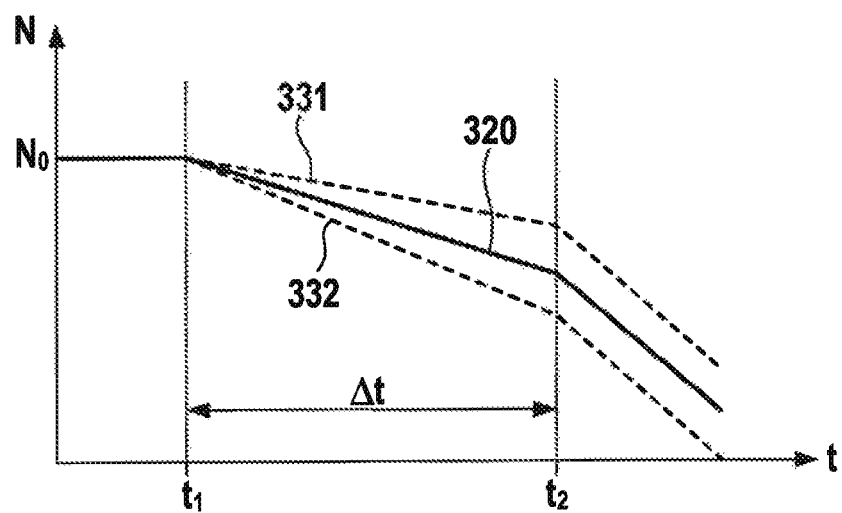

In FIG. 3b, curve 320 is schematically represented, similar to FIG. 3a. Similar to FIG. 3a, the test torque of 1 Nm is imparted between point in time $t_1$ and point in time $t_2$ during test time interval $\Delta t$ of 100 ms.

Curve 331 in FIG. 3b corresponds to the case, for example, in which the actually transmitted torque is greater than the specified test torque, similar to step 206. The torque accuracy is therefore insufficient. Speed N decreases according to curve 331 less steeply during test time interval $\Delta t$ than in the case of the reference speed curve according to curve 320.

Curve 332 in FIG. 3b corresponds to the case, for example, in which the actually transmitted torque is less than the specified test torque, similar to step 206. The torque accuracy is therefore likewise insufficient. Speed N decreases according to curve 332 more steeply during test time interval $\Delta t$ than in the case of the reference speed curve according to curve 320.

What is claimed is:

1. A method for controlling a belt-driven starter generator of an internal combustion engine, the method comprising:
   during a predefined test time interval during coasting down of the internal combustion engine:
   controlling, by a processor, the belt-driven starter generator to provide to the internal combustion engine a specified test torque; and
   determining, by a processor, a speed variable that is a function of a speed of the internal combustion engine;
   comparing, by the processor, the determined speed variable to a reference variable;
   deducing, by the processor and based on a result of the comparison, a torque accuracy at which the belt-driven starter generator provides torque to the internal combustion engine relative to setpoints specified by the processor; and
   based on the deduced torque accuracy, the processor controlling the belt-driven starter generator, wherein a check is carried out as part of the comparison between the determined speed variable and the reference variable to determine whether the speed of the internal combustion engine decreases according to a predefined reference curve during the test time interval.

2. The method of claim 1, wherein the deduced torque accuracy is insufficient, and the controlling based on the deduced torque accuracy includes correcting the torque transmitted from the belt-driven starter-generator.

3. The method of claim 1, wherein the comparison indicates that the speed of the internal combustion engine is not decreasing according to the predefined reference curve during the test time interval, and the deducing therefore is that the torque accuracy is insufficient.

4. The method of claim 1, wherein a statistical evaluation of a plurality of determined speed variables is carried out.

5. The method of claim 4, wherein a time series analysis of the plurality of determined speed variables is carried out.

6. The method of claim 1, wherein the evaluated speed variable is checked for plausibility with the aid of statistical functions.

7. The method of claim 1, wherein the speed of the internal combustion engine is determined as the speed variable.

8. A non-transitory computer-readable medium on which are stored instructions that are executable by a processor and that, when executed by the processor, cause the processor to perform a method for controlling a belt-driven starter generator of an internal combustion engine, the method comprising:
   during a predefined test time interval during coasting down of the internal combustion engine:
   controlling the belt-driven starter generator to provide to the internal combustion engine a specified test torque; and
   determining a speed variable that is a function of a speed of the internal combustion engine;
   comparing the determined speed variable to a reference variable;
   deducing, based on a result of the comparison, a torque accuracy at which the belt-driven starter generator provides torque to the internal combustion engine relative to setpoints specified by the processor; and
   based on the deduced torque accuracy, the processor controlling the belt-driven starter generator, wherein a check is carried out as part of the comparison between the determined speed variable and the reference variable to determine whether the speed of the internal combustion engine decreases according to a predefined reference curve during the test time interval.

9. A device for controlling a belt-driven starter generator of an internal combustion engine, the device comprising:
   processing circuitry interfacing with the belt-driven starter generator, wherein the processing circuitry is configured to:
   during a predefined test time interval during coasting down of the internal combustion engine:
   control the belt-driven starter generator to provide to the internal combustion engine a specified test torque; and
   determine a speed variable that is a function of a speed of the internal combustion engine;
   compare the determined speed variable to a reference variable;
   deduce, based on a result of the comparison, a torque accuracy at which the belt-driven starter generator provides torque to the internal combustion engine relative to setpoints specified by the processor; and
   based on the deduced torque accuracy, control the belt-driven starter generator, wherein a check is carried out as part of the comparison between the determined speed variable and the reference variable to determine whether the speed of the internal combustion engine decreases according to a predefined reference curve during the test time interval.

* * * * *